United States Patent [19]

Roba et al.

[11] 4,414,164

[45] Nov. 8, 1983

[54] PROCESS AND APPARATUS FOR PRODUCING PREFORMS FOR OPTICAL FIBERS

[75] Inventors: Giacomo Roba, Cogoleto; Paolo Vergnano, Chieri, both of Italy

[73] Assignee: Caselt - Centro Studi e Laboratori Telecomunicazioni S.p.A., Turin, Italy

[21] Appl. No.: 185,514

[22] Filed: Sep. 9, 1980

[30] Foreign Application Priority Data

Sep. 10, 1979 [IT] Italy .............................. 68789 A/79

[51] Int. Cl.³ ............................................ B05B 13/02
[52] U.S. Cl. .................................... 264/1.2; 264/1.6; 264/2.1; 264/2.6; 264/13; 264/309; 264/310
[58] Field of Search .................. 264/81, 1.2, 1.5, 1.6, 264/2.1, 2.6, 2.7, 13, 309, 310; 427/110, 168

[56] References Cited

U.S. PATENT DOCUMENTS 2,570,245 10/1951 Junge .................................. 427/110

3,636,492 1/1972 Yamashita .......................... 427/110

Primary Examiner—John A. Parrish
Attorney, Agent, or Firm—Karl F. Ross

[57] ABSTRACT

In order to produce a preform or parison from which an optical fiber can be drawn, a vitrifiable substance such as silicon chloride and a doping agent such as germanium chloride, for example, are fed in liquid form and at room temperature to a spray nozzle together with water or steam for continuous deposition on a relatively rotating and axially reciprocating inner or outer surface of a cylindrical support until that surface is covered with a heavy layer of as yet unvitrified hydrated silica admixed with the doping agent in proportions designed to provide a selected refractive-index profile. The resulting preform, after degassing and separation from the support if necessary, is freed from occluded water molecules by exposure to a flow of hot dehydrating gas which may contain anhydrous compounds and is thereafter collapsed into a solid rod and completely vitrified at high temperatures.

5 Claims, 4 Drawing Figures

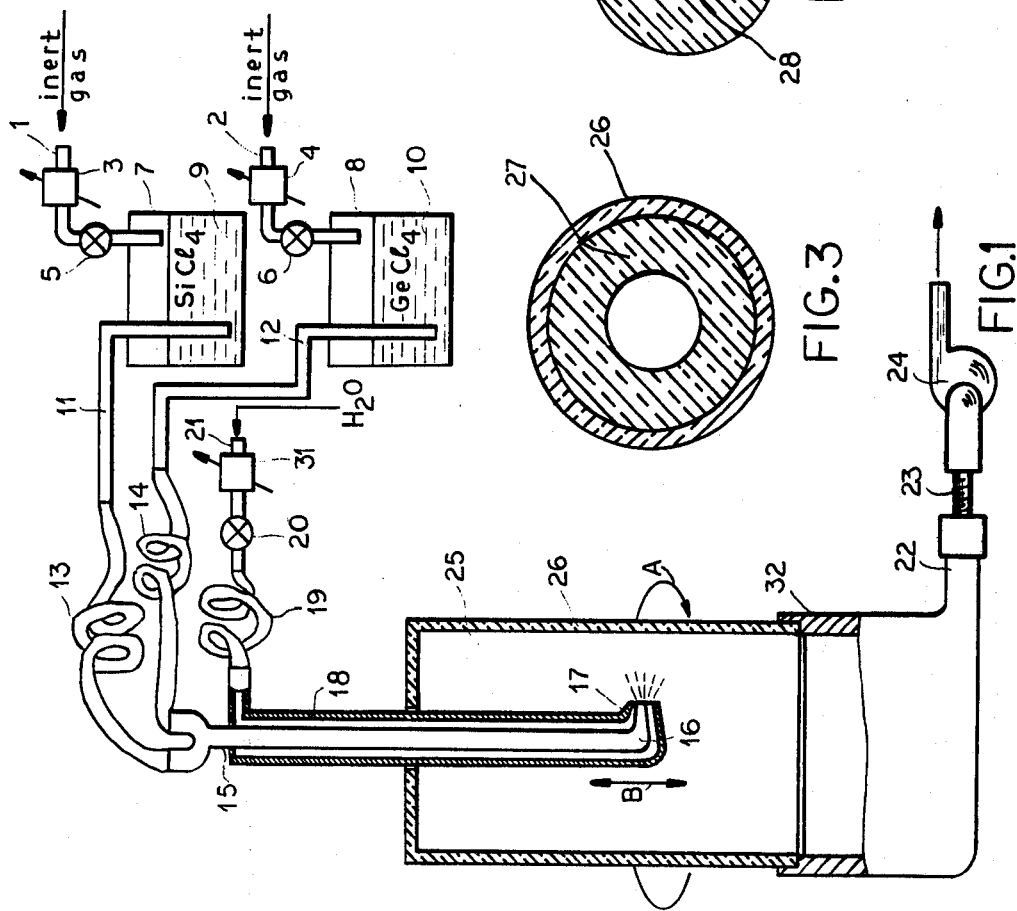
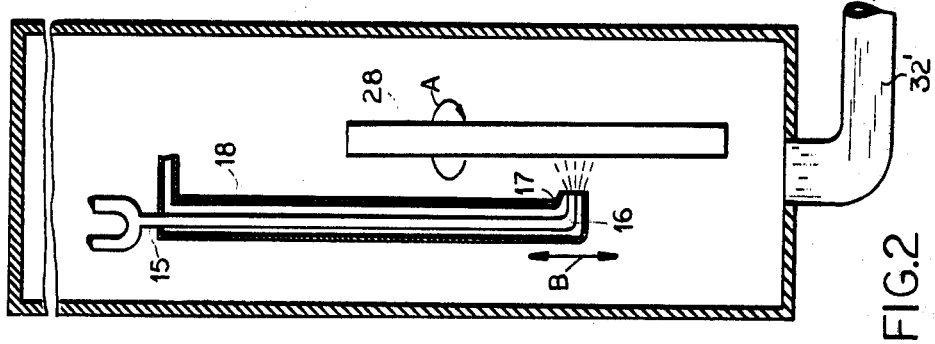
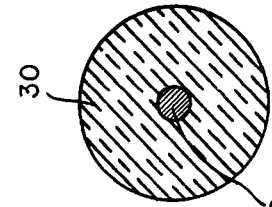
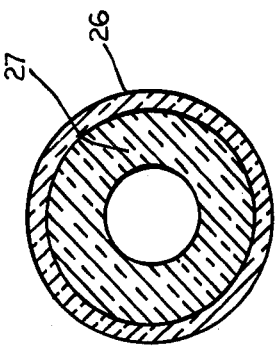

PROCESS AND APPARATUS FOR PRODUCING PREFORMS FOR OPTICAL FIBERS

FIELD OF THE INVENTION

Our present invention relates to a process and an apparatus for producing preforms or parisons for optical fibers.

BACKGROUND OF THE INVENTION

In the production of such fibers, especially those used in telecommunication systems which are to have a selected radial refractive-index profile, it is known to provide a cylindrical preform or parison conforming to the selected index profile and then to draw the preform at an elevated temperature into a fiber of considerably smaller diameter. In a first step (a) of making the preform, a silicon halide is reacted with an oxidant in the presence of a doping agent to produce a resulting vitrifiable material which, in a second step (b), is deposited on a cylindrical supporting surface to form a porous tubular structure wherein the desired refractive-index profile is established by suitable dosing of the constituents; in a third step (c), this tubular structure is then collapsed at high temperature into a solid rod which thereupon is thermally vitrified in a fourth step (d) unless such vitrification has already occurred at an earlier stage.

Conventionally, the constituents used in step (a) are interacted in a vapor phase at correspondingly high temperatures. Step (b), therefore, utilizes the technique known as CVD (chemical-vapor deposition) which can be practiced on an inner surface of a supporting tube (ICVD) or on an outer surface of a supporting mandrel (OCVD). In both instances the chemical reactants are oxidized during deposition by the flame of a burner in an oxygen-enriched atmosphere.

The deposits thus formed on an inner or outer supporting surface consists essentially of powdered silica doped with the oxide or oxides of one or more reactants initially admixed with the vaporized silicon halide. Typical chemical reactions include the following:

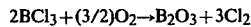

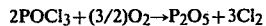

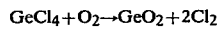

Generally, the deposition is carried out with relative rotation and axial reciprocation of the support and the vapor source whereby successive layers are built up by helicoidal passes until the deposit has reached the necessary radial thickness. With ICVD and a supporting tube of silica glass, the support may be collapsed together with the vitrifiable tubular structure to form an external sheath on the resulting fiber. With OCVD, on the other hand, the supporting mandrel is removed before the collapsing step.

The high temperatures required in these processes give rise to technical problems and necessitate the use of complex equipment including automatic-control systems designed to maintain the operating temperature in a well-defined range. Because of the low density of the vapors, the deposition is relatively slow since the rate of reactant feed must be limited in order to prevent the entrainment of bubbles of unreacted halide into the structure of the preform which, after vitrification, would impair the optical qualities of the fiber. These optical qualities would also be adversely affected by occlusions of metallic impurities or water molecules.

OBJECTS OF THE INVENTION

An important object of our present invention, therefore, is to provide an improved process for making such preforms which does not require high temperatures prior to vitrification and allows accelerated deposition of doped silica on a supporting surface.

A related object is to provide a relatively simple apparatus for carrying out this process.

SUMMARY OF THE INVENTION

In accordance with our present improvement, steps (a) and (b) are performed substantially at room temperature with the silicon halide and the doping agent or agents present in liquid form, these liquids being jointly sprayed together with the requisite oxidant upon the supporting surface in step (b); the spray and the supporting surface are subjected to relative rotation and axial reciprocation in order to coat that surface in a multiplicity of helicoidal passes, as known per se, while the feed rates of the liquids are relatively dosed in accordance with the selected refractive-index profile.

Pursuant to a more particular feature of our invention, the oxidant used in step (a) is water or steam so that the tubular structure produced in step (b) consists essentially of selectively doped hydrated silica. Before being collapsed in step (c), the tubular structure is subjected to dehydration; this could be carried out by simple exposure to a flow of hot, inert drying gas, yet we prefer to use for that purpose a gas containing an anhydrous compound capable of reacting with water molecules in the hydrated silica.

An apparatus embodying our invention, having a first stage for carrying out steps (a) and (b) followed by one or more stages to carry out the remaining steps, comprises in its first stage two vessels respectively containing a liquid silicon halide and a liquid doping agent. That stage further comprises one or more nozzles confronting a cylindrical supporting surface in a space which is maintained at substantially room temperature, the nozzle or nozzles being connected to the aforementioned vessels and to a supply of oxidizing fluid for jointly spraying the silicon halide and the doping agent together with the oxidant upon the cylindrical surface during relative rotation and axial reciprocation of the support and the nozzle or nozzles by suitable drive means. We further provide dosing means between the vessels and the nozzle assembly for supplying the liquid silicon halide and the liquid doping agent to that assembly at relative rates corresponding to the desired refractive-index profile.

If the support is a hollow cylinder forming a fluidtight chamber, the nozzle assembly will be disposed in that chamber for spraying its inner peripheral wall surface. If, on the other hand, the support is a mandrel, the nozzle assembly should be disposed adjacent the mandrel inside a fluidtight chamber for spraying the outer peripheral mandrel surface. In either case, the chamber so formed is advantageously provided with suction means for extracting residual gases.

BRIEF DESCRIPTION OF THE DRAWING

The above and other features of our invention will now be described in detail with reference to the accompanying drawing in which:

FIG. 1 is a diagrammatic sectional representation of an apparatus for the production of fiber preforms in accordance with our invention;

FIG. 2 is a view similar to FIG. 1, illustrating a modification;

FIG. 3 is a cross-sectional view of a cylindrical support, shown in FIG. 1, together with a vitrifiable tubular deposit on its inner surface; and FIG. 4 is a cross-sectional view of a similar deposit formed on the outer surface of a mandrel included in the apparatus of FIG. 2.

SPECIFIC DESCRIPTION

In FIG. 1 we have shown two conduits 1 and 2 through which an inert high-pressure gas can be fed into respective vessels 7 and 8 under the control of flow meters 3 and 4 in line with shut-off valves 5 and 6. Vessels 7 and 8 are closed and contain two liquid reactants, namely silicon chloride 9 and germanium chloride 10, respectively. Under the pressure of the incoming gas, these liquids are expelled via conduits 11 and 12 as well as flexible tubing 13 and 14 into a common feed pipe 15 terminating in a nozzle 16. Another nozzle 17, concentrically surrounding the nozzle 16, is connected by way of a feed pipe 18—coaxially surrounding the pipe 15—and flexible tubing 19 to a conduit 21, provided with a flow meter 31 and a shut-off valve 20, through which water or steam is passed at a controlled rate so as to reach the nozzle assembly 16, 17 together with the reactants from vessels 7 and 8. This outlet is trained upon the inner wall surface of a tubular support 26, preferably consisting of silica glass, which forms part of an airtight reaction chamber 25. Inside this chamber, which is maintained at ambient temperature and whose atmosphere is controlled by the continuous removal of gaseous reaction products through an outlet 22 via tubing 23 and a suction pump 24, nozzles 16 and 17 continuously spray the liquid reactants together with the accompanying oxidant (water) onto the inner peripheral surface of tube 26 while that tube and the nozzle assembly confronting that surface are relatively rotated and axially reciprocated with the aid of drive means schematically represented by arrows A, B. Thus, the inner tube surface is progressively coated with a vitrifiable tubular deposit 27 of porous or spongy character, as shown in FIG. 3.

Reacting with the water, the silicon chloride discharged in the form of fine droplets from nozzle 16 is converted to hydrated silica according to the formula

The silica, of course, is doped with the reactant from vessel 8, here germanium chloride, which is converted to germanium oxide according to the formula

With the aid of flow meters 3 and 4, the proportion of germanium chloride in the silica is controlled and may be varied continuously or in steps to provide a desired refractive-index profile throughout the cross-section of the still unvitrified and tubular preform 27. More specifically, the ratio of GeO$_2$ to silica may be progressively increased to provide a preform and thus a fiber whose refractive index is highest in the vicinity of its axis. With external deposition, as described hereinafter with reference to FIGS. 2 and 4, the concentration of GeO$_2$ would have to be progressively reduced for the same purpose.

Other doping agents of the refractivity-increasing type, which could be used in lieu of or in combination with germanium oxide, are the oxides of aluminum and phosphorus derived from corresponding chlorides by interaction with water. A refractivity-reducing agent would be boron oxide similarly derived from its chloride.

Advantageously, the relative rotation of nozzle assembly and supporting tube serving for helicoidal deposition is accomplished by a rotation of tube 26 in order to subject the deposit 27 to a centrifugal force which enhances the cohesion of its particles; without such centrifugation, as in the case of external deposition, that cohesion is due only to colloidal and electrostatic forces. To facilitate its rotation, tube 26 is coupled with outlet 22 through a hermetic rotary joint 32.

With the apparatus shown in FIG. 2, nozzle assembly 16, 17 is disposed inside a fluidtight chamber 29 from which residual gases can again be drawn off via an outlet 32' and a pump 24 (FIG. 1). With chamber 29 advantageously stationary, rotary joint 32 will not be needed. A mandrel 28, preferably made of graphite or quartz, is rotatably mounted in chamber 29 in which nozzle assembly 16, 17 is vertically reciprocable to coat that mandrel with a spongy deposit 30, FIG. 4, of doped hydrated silica as described above. This deposit will have to be stripped from mandrel 28 before being vitrified and collapsed into a solid rod which can then be drawn into a fiber.

The two porous preforms 27 and 30 are of milky appearance and contain water molecules which must be eliminated in order to avoid objectionable variations in the refractive index. For this purpose the tubular body 27 (still with its sheath 26) or 30 (without its mandrel 28) is placed in a furnace traversed by a high-temperature gas flow which preferably contains a dehydrating agent operating, for example, according to one of the following formulas:

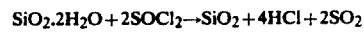

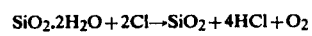

The same furnace, or a different one, can then be used for the collapsing and vitrification steps. Thereafter, the rod-shaped preform can be drawn into a fiber through a bottom outlet of the vitrification furnace as is well known per se.

We have found that operation at low temperature in accordance with our present invention avoids the generation of internal stresses in the tubular deposit and therefore enables same to be produced with relatively large thickness without cracking.

We claim:

1. In a process for making a preform from which an optical fiber can be drawn, including the steps of (a) reacting a silicon halide with an oxidant in the presence of a doping agent, (b) depositing the resulting vitrifiable material on a cylindrical supporting surface to form a porous tubular structure having a selected refractive-index profile, (c) collapsing said tubular structure at high temperature into a solid rod, and (d) thermally vitrifying said rod, the improvement wherein steps (a) and (b) are performed substantially at room temperature with said silicon halide and said doping agent present in liquid form, the two liquids being intermixed and jointly conducted to a spray nozzle confronting said supporting surface and being admixed in said spray nozzle with said oxidant for entrainment in a single spray onto said supporting surface in step (b) with relative rotation and axial reciprocation of the spray and said supporting surface to coat the latter in a multiplicity of helicoidal passes while progressively varying the relative feed rates of said liquids during at least some of said passes in accordance with the selected refractive-index profile.

2. A process as defined in claim 1 wherein said oxidant is water or steam whereby the tubular structure produced in step (b) consists essentially of selectively doped hydrated silica, said structure being subjected to dehydration prior to collapsing in step (c).

3. A process as defined in claim 2 wherein said dehydration is carried out by exposing said structure to a flow of hot drying gas.

4. A process as defined in claim 3 wherein said drying gas contains an anhydrous compound capable of reacting with water molecules in the hydrated silica.

5. A process as defined in claim 1, 2, 3 or 4 wherein the silicon halide is $SiCl_4$.

* * * * *